(12) United States Patent
Huang

(10) Patent No.: US 9,973,812 B2
(45) Date of Patent: *May 15, 2018

(54) MULTI-SCREEN INTERACTION METHOD AND SYSTEM

(71) Applicant: Huawei Technologies Co., Ltd., Shenzhen (CN)

(72) Inventor: Bo Huang, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days. days.

This patent is subject to a terminal disclaimer.

(21) Appl. No.: 15/370,903

(22) Filed: Dec. 6, 2016

(65) Prior Publication Data

US 2017/0085944 A1  Mar. 23, 2017

Related U.S. Application Data

(63) Continuation of application No. 14/541,409, filed on Nov. 14, 2014, now Pat. No. 9,538,237, which is a
(Continued)

(30) Foreign Application Priority Data

May 17, 2012  (CN) .......................... 2012 1 0153890

(51) Int. Cl.
*H04N 21/239* (2011.01)
*H04N 21/24* (2011.01)
(Continued)

(52) U.S. Cl.
CPC ... *H04N 21/43637* (2013.01); *H04N 21/4122* (2013.01); *H04N 21/4302* (2013.01);
(Continued)

(58) Field of Classification Search
CPC ............. H04N 21/2393; H04N 21/242; H04N 21/254; H04N 21/258; H04N 21/25825; H04N 21/25833; H04N 21/25866
(Continued)

(56) References Cited

U.S. PATENT DOCUMENTS 8,763,060 B2* 6/2014 Jerremy ............. H04N 21/4126
                                                     725/110
8,955,001 B2* 2/2015 Bhatia .................. H04N 21/252
                                                     725/12
(Continued)

FOREIGN PATENT DOCUMENTS

CN   101517975 A   8/2009
CN   101945252 A   1/2011
(Continued)

OTHER PUBLICATIONS

Machine Translation and Abstract of Chinese Publication No. CN101517975, Aug. 26, 2009, 17 pages.
(Continued)

*Primary Examiner* — Dominic D Saltarelli
(74) *Attorney, Agent, or Firm* — Conley Rose, P.C.

(57) ABSTRACT

A multi-screen interaction method is provided that includes sending, by a source device, device parameters of the source device to a target device that accesses a local area network where the source device is located, and receiving device parameters of the target device that are sent by the target device; sending, by the source device, media information of media content to the target device; requesting, by the target device, the media content from a network server according to the media information and the device parameters of the target device; sending, by the network server according to the device parameters of the target device, media content corresponding to the device parameters of the target device to the target device; and finding, by the target device, a play
(Continued)

state of the media content that is being played by the source device, and playing the media content according to the play state.

20 Claims, 5 Drawing Sheets

Related U.S. Application Data continuation of application No. PCT/CN2012/083336, filed on Oct. 22, 2012.

(51) Int. Cl.
| | |
|---|---|
| H04N 21/254 | (2011.01) |
| H04N 21/258 | (2011.01) |
| H04N 21/4363 | (2011.01) |
| H04N 21/4788 | (2011.01) |
| H04N 21/41 | (2011.01) |
| H04N 21/43 | (2011.01) |
| H04N 21/437 | (2011.01) |
| H04N 21/472 | (2011.01) |
| H04N 21/643 | (2011.01) |
| H04N 21/6587 | (2011.01) |
| H04N 21/436 | (2011.01) |
| H04N 21/658 | (2011.01) |

(52) U.S. Cl.
CPC ....... H04N 21/437 (2013.01); H04N 21/4307 (2013.01); H04N 21/43615 (2013.01); H04N 21/4788 (2013.01); H04N 21/47217 (2013.01); H04N 21/64322 (2013.01); H04N 21/6581 (2013.01); H04N 21/6587 (2013.01)

(58) Field of Classification Search
USPC .............. 725/24, 34, 60, 61, 80, 82, 87, 133
See application file for complete search history.

(56) References Cited

U.S. PATENT DOCUMENTS

| | | | | |
|---|---|---|---|---|
| 2002/0144273 | A1* | 10/2002 | Reto | H04L 29/06027 725/86 |
| 2005/0097623 | A1* | 5/2005 | Tecot | G11B 27/10 725/136 |
| 2006/0107299 | A1* | 5/2006 | Bartfeld | H04N 7/17318 725/110 |
| 2007/0124775 | A1* | 5/2007 | DaCosta | H04N 7/17318 725/62 |
| 2008/0218432 | A1 | 9/2008 | Ota | |
| 2012/0011550 | A1 | 1/2012 | Holland | |

FOREIGN PATENT DOCUMENTS

| | | |
|---|---|---|
| CN | 102006519 A | 4/2011 |
| CN | 102185884 A | 9/2011 |
| CN | 102377823 A | 3/2012 |
| EP | 1845684 A1 | 10/2007 |
| EP | 1940111 A2 | 7/2008 |
| EP | 2043323 A1 | 4/2009 |
| JP | 2006039918 A | 2/2006 |
| JP | 2008160301 A | 7/2008 |
| JP | 2008160581 A | 7/2008 |
| JP | 2009130876 A | 6/2009 |
| JP | 2011004431 A | 1/2011 |
| JP | 2011160119 A | 8/2011 |
| JP | 2012049875 A | 3/2012 |
| KR | 20070044438 A | 4/2007 |
| WO | 2008035943 A1 | 3/2008 |
| WO | 2010023828 A1 | 3/2010 |

OTHER PUBLICATIONS

Machine Translation and Abstract of Chinese Publication No. CN101945252, Jan. 12, 2011, 3 pages.
Machine Translation and Abstract of Chinese Publication No. CN102006519, Apr. 6, 2011, 6 pages.
Machine Translation and Abstract of Japanese Publication No. JP2011160119, Aug. 18, 2011, 22 pages.
Chakraborty, G., et al., "Analysis of the Bluetooth device discovery protocol," XP019775584, Wireless Network, vol. 16, No. 2, Oct. 15, 2008, 16 pages.
Mas, I., et al., "IPTV Session Mobility," XP031364952, Third International Conference on Communications and Networking in China, Aug. 25, 2008, 7 pages.
Chuanyang, M., "HSTP.SMTD Technical Paper: IPTV service over multiple terminal devices (New): Output draft (Q13/16 ad-hoc meeting, Dubai," IPTV-GSI, TD X (GEN/IPTV-GSI), Sep. 21-22, 2011, 30 pages.
Foreign Communication From a Counterpart Application, Japanese Application No. 2015-511899, Japanese Notice of Allowance dated Jun. 12, 2016, 3 pages.
Foreign Communication From a Counterpart Application, Japanese Application No. 2015-511899, English Translation of Japanese Notice of Allowance dated Jun. 22, 2016, 2 pages.
Foreign Communication From a Counterpart Application, Japanese Application No. 2015-511899, Japanese Office Action dated Nov. 4, 2015, 4 pages.
Foreign Communication From a Counterpart Application, Japanese Application No. 2015-511899, English Translation of Japanese Office Action dated Nov. 4, 2015, 5 pages.
Foreign Communication From a Counterpart Application, Korean Application No. 10-2014-7034379, Korean Office Action dated Dec. 12, 2015, 5 pages.
Foreign Communication From a Counterpart Application, Korean Application No. 10-2014-7034379, English Translation of Korean Office Action dated Dec. 23, 2017, 7 pages.
Foreign Communication From a Counterpart Application, Korean Application No. 2016-045177849, Korean Notice of Allowance dated Jun. 22, 2016, 3 pages.
Foreign Communication From a Counterpart Application, Chinese Application No. 201210153890.0, Chinese Office Action dated Dec. 7, 2015, 7 pages.
Foreign Communication From a Counterpart Application, European Application No. 12876887.6, Extended European Search Report dated Sep. 18, 2015, 10 pages.
Foreign Communication From a Counterpart Application, PCT Application No. PCT/CN2012/083336, English Translation of International Search Report dated Feb. 28, 2013, 2 pages.
Foreign Communication From a Counterpart Application, PCT Application No. PCT/CN2012/083336, English Translation of Written Opinion dated Feb. 28, 2013, 7 pages.
Machine Translation and Abstract of Japanese Publication No. JP2012049875, Mar. 8, 2012, 20 pages.
Machine Translation and Abstract of Japanese Publication No. JP2008160301, Jul. 10, 2008, 15 pages.
Foreign Communication From a Counterpart Application, Japanese Application No. 2016-158086, Japanese Office Action dated Sep. 19, 2017, 5 pages.
Foreign Communication From A Counterpart Application, European Application No. 12876887.6, European Office Action dated Mar. 14, 2018, 7 pages.

* cited by examiner

MULTI-SCREEN INTERACTION METHOD AND SYSTEM

CROSS-REFERENCE TO RELATED APPLICATIONS

This application is a continuation of U.S. patent application Ser. No. 14/541,409, filed on Nov. 14, 2014, which is a continuation of International Application No. PCT/CN2012/083336, filed on Oct. 22, 2012, which claims priority to Chinese Patent Application No. 201210153890.0, filed on May 17, 2012, all of which are hereby incorporated by reference in their entireties.

TECHNICAL FIELD

The present invention relates to the field of communications technologies, and in particular, to a multi-screen interaction method and system.

BACKGROUND

Multi-screen interaction refers to a series of operations such as transmission, parsing, presentation, and control performed for multimedia (audio, video, image, and the like) content on screens of different terminals, for example, a plurality of types of devices, such as a television, a mobile terminal, and a personal computer. Multi-screen interaction may share presented content on devices of different terminal platforms simultaneously and can enrich a user's multimedia life.

Currently, most homes are equipped with devices such as a set top box (STB) or a home media server. Generally, a device at home such as a television is connected to the STB or the home media server. The STB or the home media server can be connected to a home network (for example, a network at home based on a router), while generally, a mobile terminal (for example, a smartphone or a tablet computer) can also be connected to the home network. Currently, one of multi-screen interaction methods is as follows. The STB or the home media server aggregates or receives media content from an external network server; when the mobile terminal or the television requires multi-screen interaction and receives same media content, the STB or the home media server acquires device information of the mobile terminal or the television (where, the device information includes but is not limited to resolution, a device brand, a device model, and the like), performs transcoding for the media content according to the device information, sends the media content after the transcoding to the mobile terminal or the television for playing, and meanwhile, synchronizes play states of the mobile terminal and the television.

In the process of implementing embodiments of the present invention, the inventor finds that the prior art has at least the following problem.

The multi-screen interaction in the prior art needs to depend on the STB or the home media server. When the STB or the home media server is offline, the multi-screen interaction cannot be performed.

SUMMARY

Embodiments of the present invention provide a multi-screen interaction method and system, which can solve a problem in the prior art that when the STB or a home media server is offline, the multi-screen interaction cannot be performed.

To achieve the foregoing objective, the present invention adopts the following technical solutions.

A multi-screen interaction method includes sending, by a source device, device parameters of the source device to a target device that accesses a local area network where the source device is located, and receiving device parameters of the target device that are sent by the target device; when the target device needs to perform multi-screen interaction, sending, by the source device, media information of media content that is being played by the source device to the target device; requesting, by the target device, the media content from a network server according to the media information and the device parameters of the target device; sending, by the network server according to the device parameters of the target device, media content corresponding to the device parameters of the target device to the target device; and after the media content sent by the network server is received, finding, by the target device according to the device parameters of the source device, a play state of the media content that is being played by the source device, and playing the media content of the target device according to the play state.

A multi-screen interaction system includes a plurality of media devices and a network server, where the media devices include a source device and a target device, the source device includes a first transceiver unit configured to send device parameters of the source device to the target device that accesses a local area network where the source device is located, and receive device parameters of the target device that are sent by the target device; and a first sending unit configured to send, when the target device needs to perform multi-screen interaction, media information of media content that is being played by the source device to the target device; the target device includes a media requesting unit configured to request the media content from the network server according to the media information and the device parameters of the target device; and a playing unit configured to after the media content sent by the network server is received, find, according to the device parameters of the source device, a play state of the media content that is being played by the source device, and play the media content of the target device according to the play state; and the network server includes a second sending unit configured to send, according to the device parameters of the target device, media content corresponding to the device parameters of the target device to the target device.

According to a multi-screen interaction method and system provided by the embodiments of the present invention, a source device and a target device exchange their device parameters, and when the target device needs to perform multi-screen interaction, the source device sends media information of media content that is being played by the source device to the target device, so that the target device requests the media content from a network server according to the media information and the device parameters of the target device; the network server sends, according to the device parameters of the target device, media content corresponding to the device parameters of the target device to the target device; and further, the target device finds, according to the device parameters of the source device, a play state of the media content that is being played by the source device, and plays the media content of the target device according to the play state. Compared with the prior art, the source device and the target device in the embodiments of the present invention avoid that the STB or a home media server needs to be depended on when the multi-screen interaction is performed; and according to device parameters of different terminals, media content of different bit rates or formats can be sent to the different terminals by using the network server, so that the source device and the target device perform the multi-screen interaction directly.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

To make the advantages of the technical solutions of the present invention clearer, the following describes the present invention in detail with reference to the accompanying drawings and embodiments.

Figure 1:
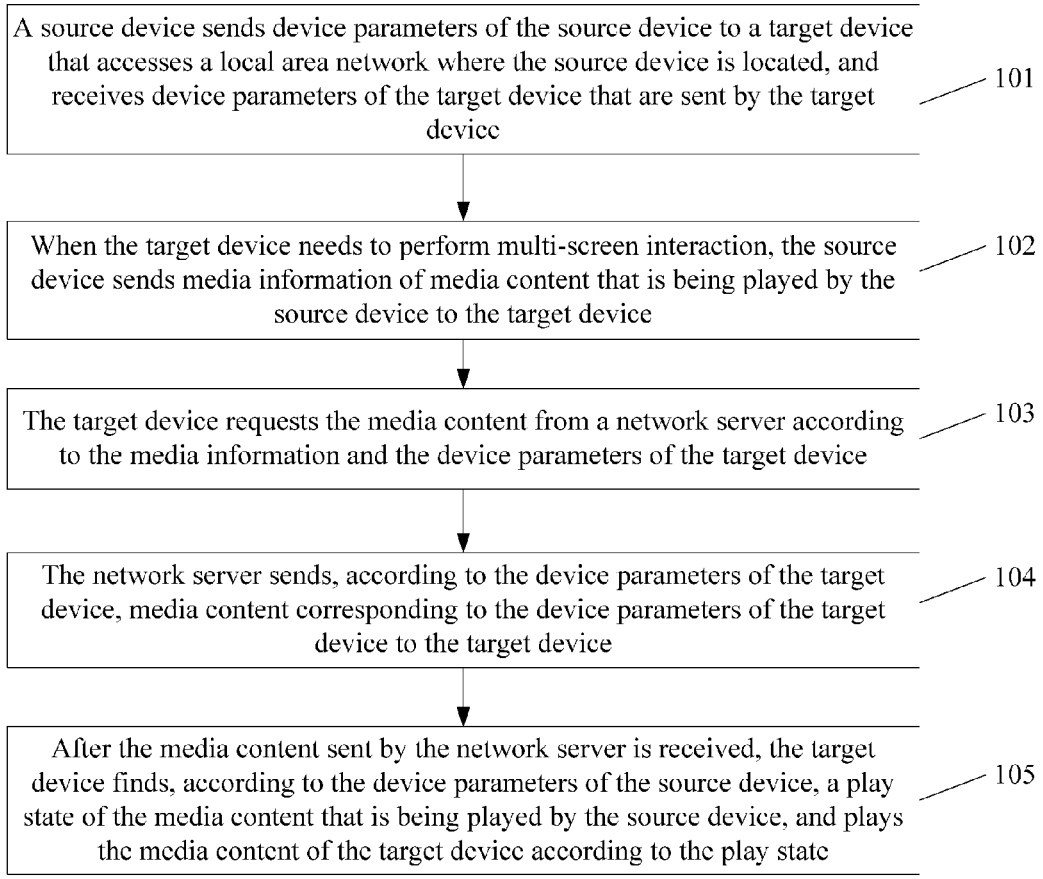
FIG. 1 is a flowchart of a multi-screen interaction method according to an embodiment of the present invention.

As shown in FIG. 1, a multi-screen interaction method provided by an embodiment of the present invention includes:

Step 101: A source device sends device parameters of the source device to a target device that accesses a local area network where the source device is located, and receives device parameters of the target device that are sent by the target device.

The device parameters may include a device vendor, a device identity, a service type supported by the device, a media format supported by the device, resolution of the device, and the like, but are not limited thereto.

The local area network where the source device is located may be, for example, a home network, but is not limited thereto.

Step 102: When the target device needs to perform multi-screen interaction, the source device sends media information of media content that is being played by the source device to the target device.

The media information may include a name of the media content, an identity of the media content, and the like, but is not limited thereto.

Step 103: The target device requests the media content from a network server according to the media information and the device parameters of the target device.

Step 104: The network server sends, according to the device parameters of the target device, media content corresponding to the device parameters of the target device to the target device.

Specifically, because the device parameters of the target device may be different from those of the source device, for example, the resolution of the target device is different from the resolution of the source device, the network server sends corresponding media content to the target device according to the parameters of the target device (according to the resolution of the target device, the media format supported by the device, and the like), so that a better effect is achieved when the media content is played on the target device.

Step 105: After the media content sent by the network server is received, the target device finds, according to the device parameters of the source device, a play state of the media content that is being played by the source device, and plays the media content of the target device according to the play state.

The target device queries the source device according to the device parameters of the source device (for example, according to the device identity of the source device).

It should be noted that the source device and the target device may be the same terminal device or different terminal devices and the target device and the source device may have a same functional module, so that in a similar scenario, the target device may act as the source device and the source device may also act as the target device, but is not limited thereto. The target device and the source device may be, for example, a television, a smartphone, a tablet computer, a notebook computer, and the like, but are not limited thereto.

According to a multi-screen interaction method provided by this embodiment of the present invention, a source device and a target device exchange their device parameters, and when the target device needs to perform multi-screen interaction, the source device sends media information of media content that is being played by the source device to the target device, so that the target device requests the media content from a network server according to the media information and the device parameters of the target device; the network server sends, according to the device parameters of the target device, media content corresponding to the device parameters of the target device to the target device; and further, the target device finds, according to the device parameters of the source device, a play state of the media content that is being played by the source device, and plays the media content of the target device according to the play state. Compared with the prior art, the source device and the target device in this embodiment of the present invention avoid that the STB or a home media server needs to be depended on when the multi-screen interaction is performed; and according to device parameters of different terminals, media content of different bit rates or formats can be sent to the different terminals by using the network server, so that the source device and the target device perform the multi-screen interaction directly.

Figure 2:
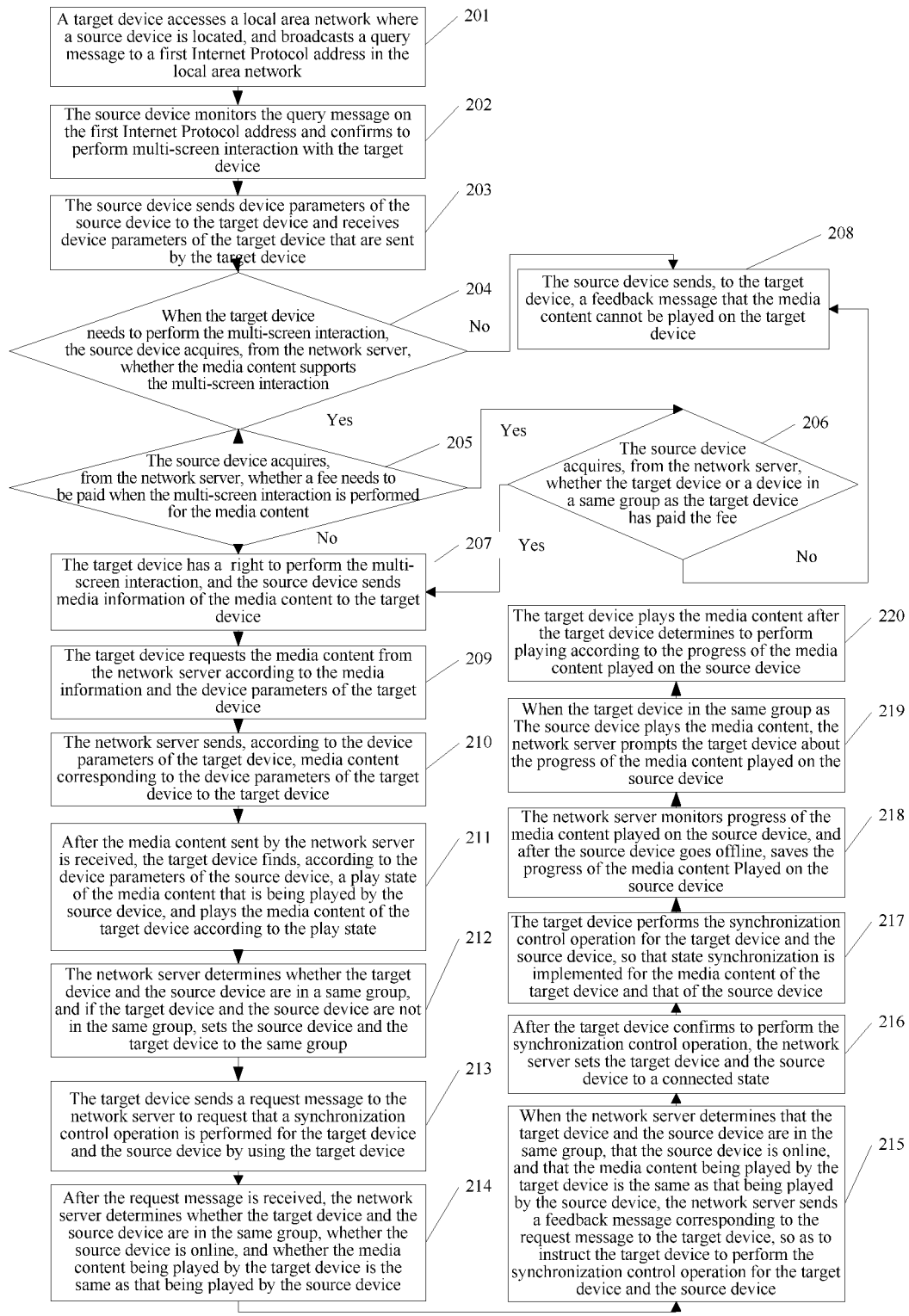
FIG. 2 is a flowchart of a multi-screen interaction method according to another embodiment of the present invention.

As shown in FIG. 2, a multi-screen interaction method provided by another embodiment of the present invention includes:

Step 201: A target device accesses a local area network where a source device is located, and broadcasts a query message to a first Internet Protocol (IP) address in the local area network.

The query message is used to query whether a device supporting multi-screen interaction exists in the local area network. The local area network may be, for example, a home network, and the first IP address may be a preset IP address, but is not limited thereto.

Step 202: The source device monitors the query message on the first IP address and confirms that multi-screen interaction with the target device is to be performed.

If the source device supports the multi-screen interaction, after monitoring the query message on the first IP address, the source device may report to a network server so as to confirm that multi-screen interaction with the target device is to be performed, but it is not limited thereto.

Step 203: The source device sends device parameters of the source device to the target device and receives device parameters of the target device that are sent by the target device.

The device parameters may include a device vendor, a device identity, a service type supported by the device, a media format supported by the device, resolution of the device, and the like, but are not limited thereto.

Step 204: When the target device needs to perform the multi-screen interaction, the source device acquires, from a network server, whether media content supports the multi-screen interaction; if the media content supports the multi-screen interaction, perform step 205; otherwise, perform step 208.

When the target device needs to play the media content that is being played by the source device, the target device needs to perform the multi-screen interaction.

In a case where both formats and resolution (for example, a high-definition video) are different, different media content has different rights, and same media content also has different rights. Therefore, the source device needs to confirm to the network server whether the media content supports the multi-screen interaction.

Step 205: The source device acquires, from the network server, whether a fee needs to be paid when the multi-screen interaction is performed for the media content; if the fee needs to be paid, perform step 206; otherwise, perform step 207.

When the multi-screen interaction is performed for the media content, the fee may need to be paid to acquire a multi-screen interaction right; or for example, device resolution of the target device is relatively high, and when the media content is played on the target device, media content with higher quality (for example, a high-definition video) is required, and therefore, the network server needs to send the media content with higher quality to the target device, and a fee may need to be paid to acquire the media content with higher quality, but is not limited thereto.

Step 206: The source device acquires, from the network server, whether the target device or a device in a same group as the target device has paid the fee; if the target device or the device in the same group as the target device has paid the fee, perform step 207; otherwise, perform step 208.

After the target device performs multi-screen interaction with some devices, the network server labels the target device and those devices as a same group, so that devices in the same group may have a same play right. For example, as long as one device among the devices in the same group has performed a payment operation, another device in the same group can play corresponding media content, and therefore, after the target device or the device in the same group as the target device has paid the fee, the target device has a right to perform the multi-screen interaction.

Step 207: The target device has a right to perform the multi-screen interaction, the source device sends media information of the media content to the target device, and the target device proceeds to step 209.

The media information may include a name of the media content, an identity of the media content, and the like, but is not limited thereto.

Step 208: The source device sends, to the target device, a feedback message that the media content cannot be played on the target device.

Optionally, the source device may further feed back, to the target device, a reason why the media content cannot be played on the target device, so as to prompt the target device to perform a corresponding action, for example, a payment operation, but is not limited thereto.

Step 209: The target device requests the media content from the network server according to the media information and the device parameters of the target device.

Step 210: The network server sends, according to the device parameters of the target device, media content corresponding to the device parameters of the target device to the target device.

Specifically, because the device parameters of the target device may be different from those of the source device, for example, the resolution of the target device is different from the resolution of the source device, the network server sends corresponding media content to the target device according to the parameters of the target device (according to the resolution of the target device, the media format supported by the device, and the like), so that a better effect is achieved when the media content is played on the target device.

Step 211: After the media content sent by the network server is received, the target device finds, according to the device parameters of the source device, a play state of the media content that is being played by the source device, and plays the media content of the target device according to the play state.

Step 212: The network server determines whether the target device and the source device are in a same group, and if the target device and the source device are not in the same group, sets the source device and the target device to the same group.

The network server labels the source device and the target device as the same group according to the device parameters of the source device and the target device (for example, identities of the devices), so that in a later application, the source device and the target device may have a same play right and may perform a corresponding synchronization control operation, but is not limited thereto.

Step 213: The target device sends a request message to the network server to request that a synchronization control operation is performed for the target device and the source device by using the target device.

Step 214: After the request message is received, the network server determines whether the target device and the source device are in the same group, whether the source device is online, and whether the media content being played by the target device is the same as that being played by the source device.

Step 215: When the network server determines that the target device and the source device are in the same group, that the source device is online, and that the media content being played by the target device is the same as that being played by the source device, the network server sends a feedback message corresponding to the request message to the target device, so as to instruct the target device to perform the synchronization control operation for the target device and the source device.

Step 216: After the target device confirms that the synchronization control operation is to be performed, the network server sets the target device and the source device to a connected state.

Step 217: The target device performs the synchronization control operation for the target device and the source device, so that state synchronization is implemented for the media content of the target device and that of the source device.

The synchronization control operation includes pausing the media content, rewinding the media content, fast-forwarding the media content, and closing the media content.

For example, if the target device fast-forwards the media content played on it, the media content played on the source device is also fast-forwarded at the same time, but is not limited thereto.

Step 218: The network server monitors progress of the media content played on the source device, and after the source device goes offline, saves the progress of the media content played on the source device.

Step 219: When the target device in the same group as the source device plays the media content, the network server prompts the target device about the progress of the media content played on the source device.

Step 220: The target device plays the media content after the target device determines to perform playing according to the progress of the media content played on the source device.

According to a multi-screen interaction method provided by the another embodiment of the present invention, a source device and a target device exchange their device parameters, and when the target device needs to perform multi-screen interaction, the source device sends media information of media content that is being played by the source device to the target device, so that the target device requests the media content from a network server according to the media information and the device parameters of the target device; the network server sends, according to the device parameters of the target device, media content corresponding to the device parameters of the target device to the target device; and further, the target device finds, according to the device parameters of the source device, a play state of the media content that is being played by the source device, and plays the media content of the target device according to the play state. Compared with the prior art, the source device and the target device in this embodiment of the present invention avoid that the STB or a home media server needs to be depended on when the multi-screen interaction is performed; and according to device parameters of different terminals, media content of different bit rates or formats can be sent to the different terminals by using the network server, so that the source device and the target device perform the multi-screen interaction directly.

Figure 3:
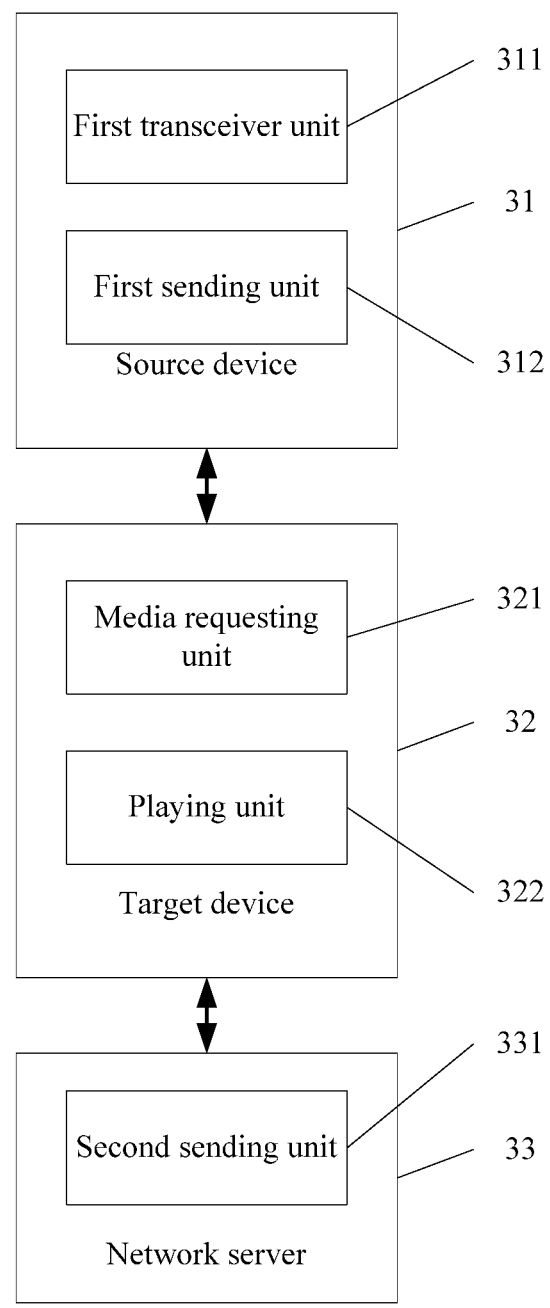
FIG. 3 is a first schematic structural diagram of a multi-screen interaction system according to an embodiment of the present invention.

As shown in FIG. 3, a multi-screen interaction system provided by an embodiment of the present invention includes a plurality of media devices and a network server 33, where the media devices include a source device 31 and a target device 32, and the source device 31 includes: a first transceiver unit 311 configured to send device parameters of the source device 31 to the target device 32 that accesses a local area network where the source device 31 is located, and receive device parameters of the target device 32 that are sent by the target device 32, where for a specific implementation manner thereof, reference is made to step 101 in FIG. 1, which is not repeatedly described herein; and a first sending unit 312 configured to send, when the target device 32 needs to perform multi-screen interaction, media information of media content that is being played by the source device 31 to the target device 32, where for a specific implementation manner thereof, reference is made to step 102 in FIG. 1, which is not repeatedly described herein.

The target device 32 includes a media requesting unit 321 configured to request the media content from the network server 33 according to the media information and the device parameters of the target device 32, where for a specific implementation manner thereof, reference is made to step 103 in FIG. 1, which is not repeatedly described herein; and a playing unit 322 configured to: after the media content sent by the network server 33 is received, find, according to the device parameters of the source device 31, a play state of the media content that is being played by the source device 31, and play the media content of the target device 32 according to the play state, where for a specific implementation manner thereof, reference is made to step 105 in FIG. 1, which is not repeatedly described herein.

The network server 33 includes: a second sending unit 331 configured to send, according to the device parameters of the target device 32, media content corresponding to the device parameters of the target device 32 to the target device 32, where for a specific implementation manner thereof, reference is made to step 104 in FIG. 1, which is not repeatedly described herein.

Figure 4:
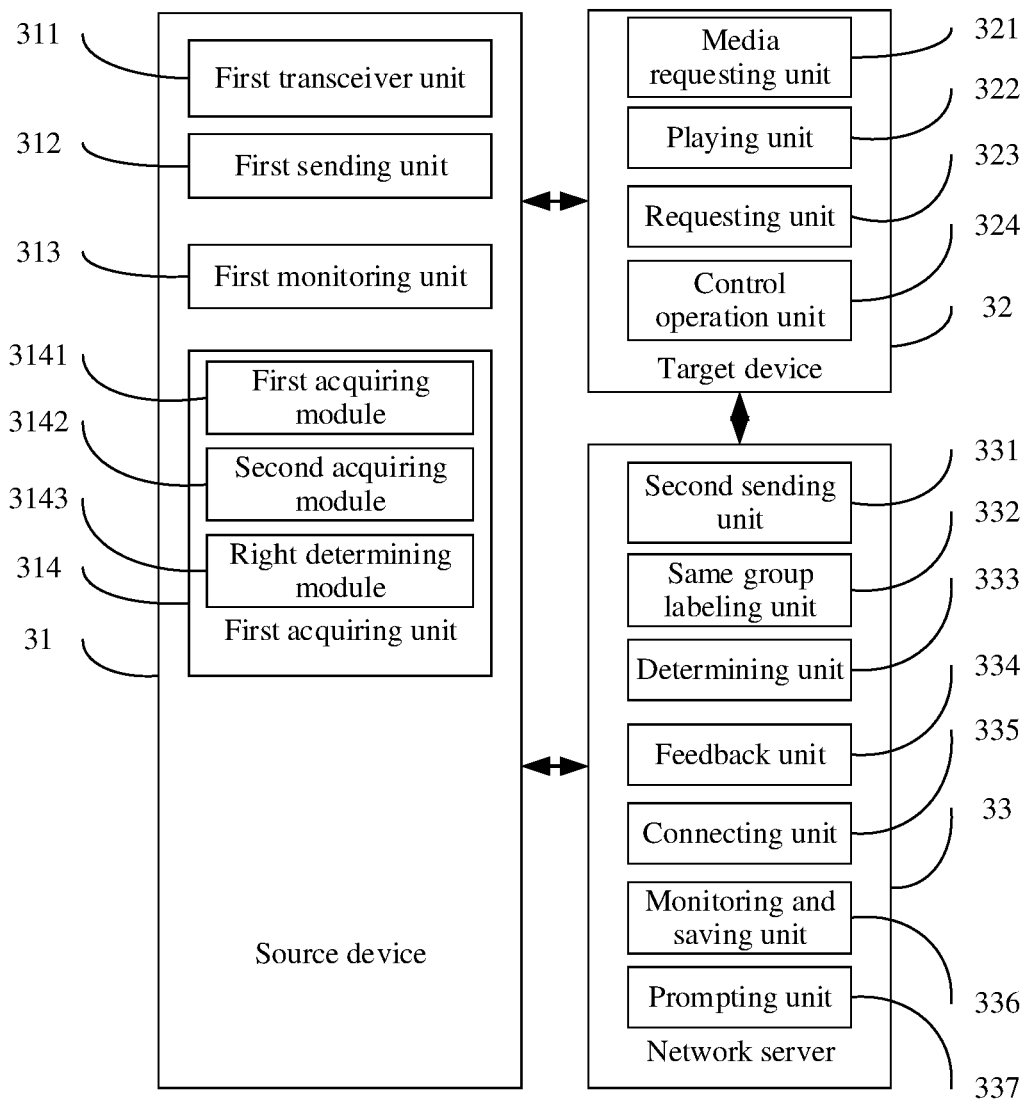
FIG. 4 is a second schematic structural diagram of a multi-screen interaction system according to an embodiment of the present invention.

Further, as shown in FIG. 4, the source device 31 further includes a first monitoring unit 313 configured to monitor a query message broadcast to a first IP address in the local area network after the target device 32 accesses the local area network where the source device 31 is located, and confirm that multi-screen interaction with the target device 32 is to be performed, where the query message is used to query whether a device supporting the multi-screen interaction exists in the local area network, and for a specific implementation manner thereof, reference is made to steps 201 and 202 in FIG. 2, which are not repeatedly described herein.

Further, as shown in FIG. 4, the network server 33 further includes a same group labeling unit 332 configured to determine whether the target device 32 and the source device 31 are in a same group, and if the target device 32 and the source device 31 are not in the same group, set the source device 31 and the target device 32 to the same group, where for a specific implementation manner thereof, reference is made to step 212 in FIG. 2, which is not repeatedly described herein.

Further, as shown in FIG. 4, the source device 31 further includes a first acquiring unit 314 configured to acquire, from the network server 33, whether the media content supports the multi-screen interaction and whether the target device 32 has a right to perform the multi-screen interaction, where for a specific implementation manner thereof, reference is made to step 204 to step 206 in FIG. 2, which are not repeatedly described herein.

The first sending unit 312 is configured to if the media content supports the multi-screen interaction and the target device 33 has the right to perform the multi-screen interaction, send the media information of the media content to the target device 32, where for a specific implementation manner thereof, reference is made to step 207 in FIG. 2, which is not repeatedly described herein.

Further, as shown in FIG. 4, the first acquiring unit 314 includes a first acquiring module 3141 configured to acquire, from the network server 33, whether the media content supports the multi-screen interaction, and after it is acquired that the media content supports the multi-screen interaction, acquire, from the network server 33, whether a fee needs to be paid when the multi-screen interaction is performed for the media content, where for a specific implementation manner thereof, reference is made to steps 204 and 205 in FIG. 2, which are not repeatedly described herein; a second acquiring module 3142 configured to acquire, from the network server 33 after it is acquired that the fee needs to be paid when the multi-screen interaction is performed for the media content, whether the target device 32 or a device in the same group as the target device 32 has paid the fee, where for a specific implementation manner thereof, reference is made to step 206 in FIG. 2, which is not repeatedly described herein; and a right determining module 3143 configured to determine, if the source device 31 acquires that the target device 32 or the device in the same group as the target device 32 has paid the fee, that the target device 32 has the right to perform multi-screen interaction, where for a specific implementation manner thereof, reference is made to step 207 in FIG. 2, which is not repeatedly described herein.

Further, as shown in FIG. 4, the target device 32 further includes a requesting unit 323 configured to send a request message to the network server 33 to request that a synchronization control operation is performed for the target device 32 and the source device 31 by using the target device 32, where for a specific implementation manner thereof, reference is made to step 213 in FIG. 2, which is not repeatedly described herein.

The network server 33 further includes a determining unit 333 configured to determine, after the request message is received, whether the target device 32 and the source device 31 are in the same group, whether the source device 31 is online, and whether the media content being played by the target device 32 is the same as that being played by the source device 31, where for a specific implementation manner thereof, reference is made to step 214 in FIG. 2, which is not repeatedly described herein; a feedback unit 334 configured to, when it is determined that the target device 32 and the source device 31 are in the same group, that the source device 31 is online, and that the media content being played by the target device 32 is the same as that being played by the source device 31, send a feedback message corresponding to the request message to the target device 32, so as to instruct the target device 32 to perform the synchronization control operation for the target device 32 and the source device 31, where for a specific implementation manner thereof, reference is made to step 215 in FIG. 2, which is not repeatedly described herein; and a connecting unit 335 configured to set the target device 32 and the source device 31 to a connected state after the target device 32 confirms that the synchronization control operation is to be performed, where for a specific implementation manner thereof, reference is made to step 216 in FIG. 2, which is not repeatedly described herein.

The target device 32 further includes a control operation unit 324 configured to perform the synchronization control operation for the target device 32 and the source device 31, so that state synchronization is implemented for the media content of the target device 32 and that of the source device 31.

The synchronization control operation includes pausing the media content, rewinding the media content, fast-forwarding the media content, and closing the media content. For a specific implementation manner thereof, reference is made to step 217 in FIG. 2, which is not repeatedly described herein.

Further, as shown in FIG. 4, the network server 33 further includes a monitoring and saving unit 336 configured to monitor progress of the media content played on the source device 31, and after the source device 31 goes offline, save the progress of the media content played on the source device 31, where for a specific implementation manner thereof, reference is made to step 218 in FIG. 2, which is not repeatedly described herein; and a prompting unit 337 configured to, when the target device 32 in the same group as the source device 31 plays the media content, prompt the target device 32 about the progress of the media content played on the source device 31, where for a specific implementation manner thereof, reference is made to step 219 in FIG. 2, which is not repeatedly described herein.

The playing unit 322 is configured to play the media content after the target device 32 determines to perform playing according to the progress of the media content played on the source device 31, where for a specific implementation manner thereof, reference is made to step 220 in FIG. 2, which is not repeatedly described herein.

It should be noted that in this embodiment of the present invention, the source device and the target device in the same group may work in a same local area network (for example, a same home network) or may work in different local area networks. If the target device and the source device work in different local area networks and need to perform multi-screen interaction, before performing the current multi-screen interaction, the target device needs to perform multi-screen interaction with the source device in the same local area network, so that remote multi-screen interaction can be implemented.

To help a person skilled in the art better understand the multi-screen interaction system provided by this embodiment of the present invention, the following provides an example of a specific application scenario of the multi-screen interaction system. It should be noted that without making creative efforts, a person skilled in the art can further provide more application scenario examples of the multi-screen interaction system, which is not limited in this specification.

Figure 5:
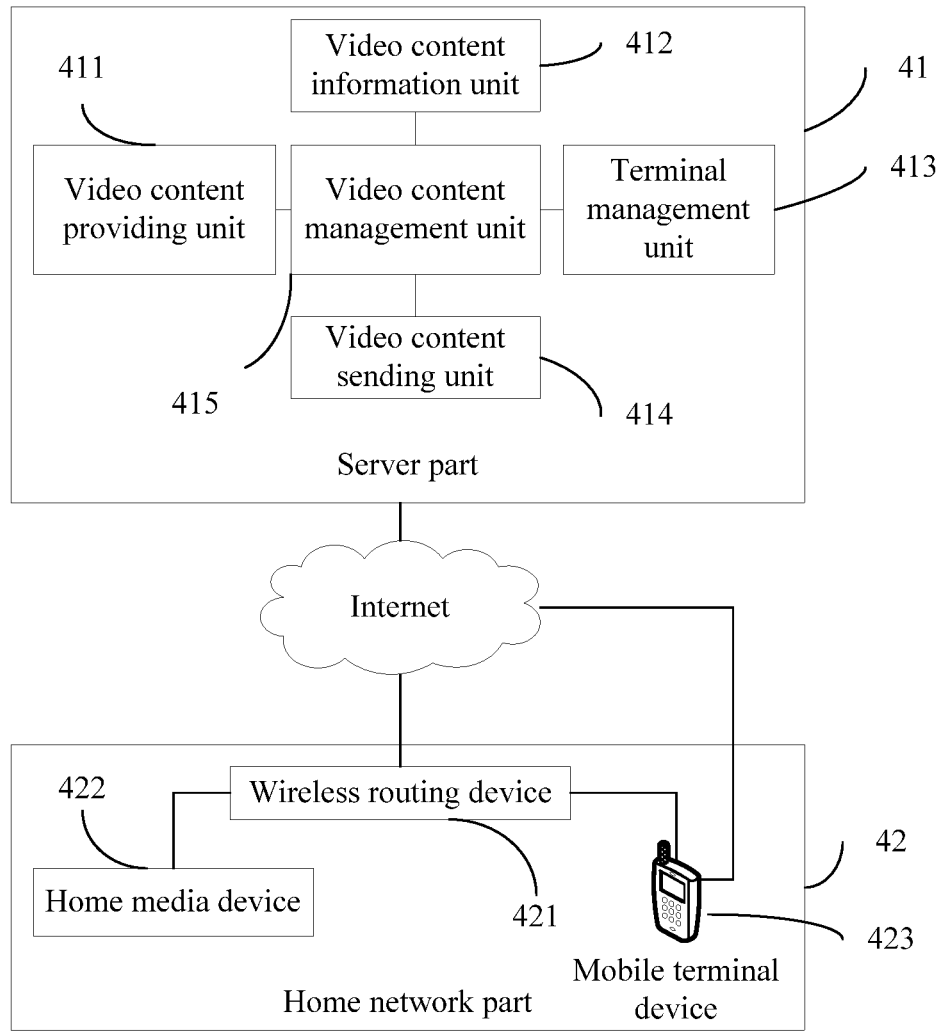
FIG. 5 is a schematic diagram of an application scenario of a multi-screen interaction system according to an embodiment of the present invention.

As shown in FIG. 5, the multi-screen interaction system may be divided into two parts, a server part 41 and a home network part 42. The server part 41 is connected to the home network part 42 through the Internet.

The server part 41 includes a video content providing unit 411, a video content information unit 412, a terminal management unit 413, a video content sending unit 414, and a video content management unit 415 that is connected to the video content providing unit 411, the video content information unit 412, the terminal management unit 413, and the video content sending unit 414.

The video content providing unit 411 is configured to provide the video content, for example, a movie, Web television, and video music.

The video content information unit 412 is configured to interconnect to related information of the video content, which may be a website that can provide related information of video content, such as a microblog and a forum, but is not limited thereto.

The terminal management unit 413 is configured to group terminals in the home network part 42.

The video content sending unit 414 is configured to send, to the home network part 42 through the Internet, the video content provided by the video content providing unit 411.

The video content management unit 415 is configured to manage a right for performing multi-screen interaction for the video content, and may retrieve the video content, but is not limited thereto.

The home network part 42 includes a wireless routing device 421, and a home media device 422 and a mobile terminal device 423 that are connected to the wireless routing device 421, where the mobile terminal device 423 may have a communication connection to the Internet.

The wireless routing device 421 is configured to construct the home network. The home media device 422 includes a streaming media player, a desktop computer, a set top box, or the like, but is not limited thereto.

According to a multi-screen interaction system provided by this embodiment of the present invention, a source device and a target device exchange their device parameters, and when the target device needs to perform multi-screen interaction, the source device sends media information of media content that is being played by the source device to the target device, so that the target device requests the media content from a network server according to the media information and the device parameters of the target device; the network server sends, according to the device parameters of the target device, media content corresponding to the device parameters of the target device to the target device; and further, the target device finds, according to the device parameters of the source device, a play state of the media content that is being played by the source device, and plays the media content of the target device according to the play state. Compared with the prior art, the source device and the target device in this embodiment of the present invention avoid that the STB or a home media server needs to be depended on when the multi-screen interaction is performed; and according to device parameters of different terminals, media content of different bit rates or formats can be sent to the different terminals by using the network server, so that the source device and the target device perform the multi-screen interaction directly.

Based on the foregoing descriptions of the embodiments, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A multi-screen interaction method, comprising:
receiving, by a target device that accesses a local area network where a source device is located, device parameters of the source device;
sending, by the target device, device parameters of the target device to the source device;
receiving, by the target device from the source device when the target device needs to perform multi-screen interaction, media information of media content that is being played by the source device;
requesting, by the target device, the media content from a network server according to the media information and the device parameters of the target device;
receiving, by the target device from the network server, the media content corresponding to the device parameters of the target device;
finding, by the target device according to the device parameters of the source device after the target device receives the media content from the network server, a play state of the media content that is being played by the source device;
playing, by the target device, the media content of the target device according to the play state;
subsequent to beginning playing the media content by the target device, sending, by the target device, a request message to the network server, wherein the request message requests that a synchronization control operation is performed for the target device and the source device using the target device such that state synchronization is implemented for the media content of the target device and the media content of the source device, wherein the synchronization control operation comprises pausing the media content, rewinding the media content, fast-forwarding the media content, or closing the media content; and
receiving, by the target device from the network server, a feedback message corresponding to the request message, wherein the feedback message instructs the target device to perform the synchronization control operation for the target device and the source device.

2. The method according to claim 1, wherein the method further comprises broadcasting, by the target device, a query message to a first Internet Protocol (IP) address in the local area network after the target device accesses the local area network where the source device is located, wherein the query message is used to query whether a device supporting the multi-screen interaction exists in the local area network.

3. The method according to claim 1, wherein the device parameters of the target device include a resolution supported by the target device.

4. The method according to claim 3, further comprising playing the media content after the target device determines to perform playing according to a progress of the media content played on the source device when the source device goes offline.

5. The method according to claim 1, wherein a format of the media content of the source device is different than a format of the media content of the target device.

6. The method according to claim 5, wherein a resolution of the media content of the source device is different than a resolution of the media content of the target device.

7. The method according to claim 1, wherein the method further comprises performing, by the target device, the synchronization control operation for the target device and the source device such that state synchronization is implemented for the media content of the target device and the media content of the source device, wherein the synchronization control operation comprises pausing the media content, rewinding the media content, fast-forwarding the media content, and closing the media content.

8. A multi-screen interaction system, comprising:
a network server; and
a plurality of media devices comprising a source device and a target device,
wherein the source device comprises:
a first memory storing first executable instructions; and
a source device processor coupled to the first memory and configured to:
send device parameters of the source device to the target device that accesses a local area network where the source device is located;
receive, from the target device, device parameters of the target device; and
send, to the target device when the target device needs to perform multi-screen interaction, media information of media content that is being played by the source device,
wherein the target device comprises:
a second memory storing second executable instructions; and
a target device processor coupled to the second memory and configured to:
request the media content from the network server according to the media information and the device parameters of the target device;
find, after the target device receives the media content from the network server and according to the device parameters of the source device, a play state of the media content that is being played by the source device;
play the media content according to the play state;
subsequent to beginning playing the media content by the target device, send a request message to the network server, wherein the request message requests that a synchronization control operation is performed for the target device and the source device using the target device such that state synchronization is implemented for the media content of the target device and the media content of the source device, wherein the synchronization control operation comprises pausing the media content, rewinding the media content, fast-forwarding the media content, or closing the media content; and
receive, from the network server, a feedback message corresponding to the request message, wherein the feedback message instructs the target device to perform the synchronization control operation for the target device and the source device, and
wherein the network server comprises a network processor configured to send, to the target device, the media content according to the device parameters of the target device.

9. The system according to claim 8, wherein the source device processor is further configured to:
monitor a query message broadcast to a first Internet Protocol (IP) address in the local area network after the target device accesses the local area network where the source device is located; and
confirm that the multi-screen interaction with the target device is to be performed, and
wherein the query message is used to query whether a device supporting the multi-screen interaction exists in the local area network.

10. The system according to claim 8, wherein the network processor is further configured to set the source device and the target device to a same group when the target device and the source device are not in the same group.

11. The system according to claim 10, wherein the network processor is further configured to:
monitor progress of the media content played on the source device;
save, after the source device goes offline, the progress of the media content played on the source device; and
prompt the target device about the progress of the media content played on the source device when the target device in the same group as the source device plays the media content, and
wherein the target device processor is configured to play the media content after the target device determines to perform playing according to the progress of the media content played on the source device.

12. The system according to claim 8, wherein the source device processor is further configured to:
determine, from the network server, whether the media content supports the multi-screen interaction and whether the target device has a right to perform the multi-screen interaction; and
send the media information of the media content to the target device when the media content supports the multi-screen interaction and the target device has the right to perform the multi-screen interaction.

13. The system according to claim 8, wherein the source device processor is further configured to:
determine, from the network server, whether the media content supports the multi-screen interaction;
determine, from the network server, whether a fee needs to be paid when the multi-screen interaction is performed for the media content after acquiring that the media content supports the multi-screen interaction;
determine, from the network server and after determining that the fee needs to be paid when the multi-screen interaction is performed for the media content, whether a third device in a same group as the target device has paid the fee;
determine, when the source device acquires that the third device in the same group as the target device has paid the fee, that the target device has the right to perform multi-screen interaction; and
send the media information of the media content to the target device when the media content supports the multi-screen interaction and the target device has the right to perform the multi-screen interaction.

14. The system according to claim 8, wherein the network processor is further configured to:
determine, after the request message is received, whether the target device and the source device are in a same group, whether the source device is online, and whether the media content being played by the target device is the same as the media content being played by the source device;
send the feedback message corresponding to the request message to the target device to instruct the target device to perform the synchronization control operation for the target device and the source device when the target device and the source device are in the same group, the source device is online, and the media content being played by the target device is the same as the media content being played by the source device; and
set the target device and the source device to a connected state after the target device confirms that the synchronization control operation is to be performed, wherein the target device processor is further configured to perform the synchronization control operation for the target device and the source device such that state synchronization is implemented for the media content of the target device and the media content of the source device, and wherein the synchronization control operation comprises pausing the media content, rewinding the media content, fast-forwarding the media content, and closing the media content.

15. A target device configured to access a local area network where a source device is located, the target device comprising:

a memory comprising instructions; and one or more processors in communication with the memory, wherein the one or more processors are configured to execute the instructions to:

receive device parameters of the source device;

send device parameters of the target device to the source device;

receive, from the source device when the target device needs to perform multi-screen interaction, media information of media content;

request the media content from a network server according to the media information and the device parameters of the target device;

receive, from the network server, the media content corresponding to the device parameters of the target device;

find, according to the device parameters of the source device after the target device receives the media content from the network server, a play state of the media content on the source device;

play the media content of the target device according to the play state;

subsequent to beginning playing the media content by the target device, send a request message to the network server, wherein the request message requests that a synchronization control operation is performed for the target device and the source device by using the target device such that state synchronization is implemented for the media content of the target device and the media content of the source device, wherein the synchronization control operation comprises pausing the media content, rewinding the media content, fast-forwarding the media content, or closing the media content; and receive, from the network server, a feedback message corresponding to the request message, wherein the feedback message instructs the target device to perform the synchronization control operation for the target device and the source device.

16. The target device of claim 15, wherein the device parameters of the target device include a resolution supported by the target device.

17. The target device of claim 15, wherein the one or more processors are further configured to execute the instructions to broadcast a query message to a first internet protocol (IP) address to query whether a device on the local area network supports multi-screen interaction.

18. The target device of claim 15, wherein a format of the media content of the source device is different than a format of the media content of the target device.

19. The target device of claim 18, wherein a resolution of the media content of the source device is different than a resolution of the media content of the target device.

20. The target device of claim 15, wherein the one or more processors are further configured to execute the instructions to perform the synchronization control operation for the target device and the source device such that state synchronization is implemented for the media content of the target device and the media content of the source device, wherein the synchronization control operation comprises pausing the media content, rewinding the media content, fast-forwarding the media content, and closing the media content.

* * * * *

UNITED STATES PATENT AND TRADEMARK OFFICE
CERTIFICATE OF CORRECTION

PATENT NO. : 9,973,812 B2
APPLICATION NO. : 15/370903
DATED : May 15, 2018
INVENTOR(S) : Bo Huang Page 1 of 1

It is certified that error appears in the above-identified patent and that said Letters Patent is hereby corrected as shown below:

On the Title Page

The first or sole Notice should read --

Subject to any disclaimer, the term of this patent is extended or adjusted under 35 U.S.C. 154(b) by 0 days.

This patent is subject to a terminal disclaimer.

Item (56) on page 2 under U.S. Patent Documents should read:
2008/0218432 A1 11/2008 Ota Signed and Sealed this
Twenty-third Day of October, 2018

Andrei Iancu
*Director of the United States Patent and Trademark Office*